Feb. 27, 1951 G. BAECHLI 2,543,519
MATERIAL HANDLING APPARATUS
Filed Aug. 22, 1946 2 Sheets-Sheet 1

Inventor:
George Baechli.
Louis A. Maxom.
Atty.

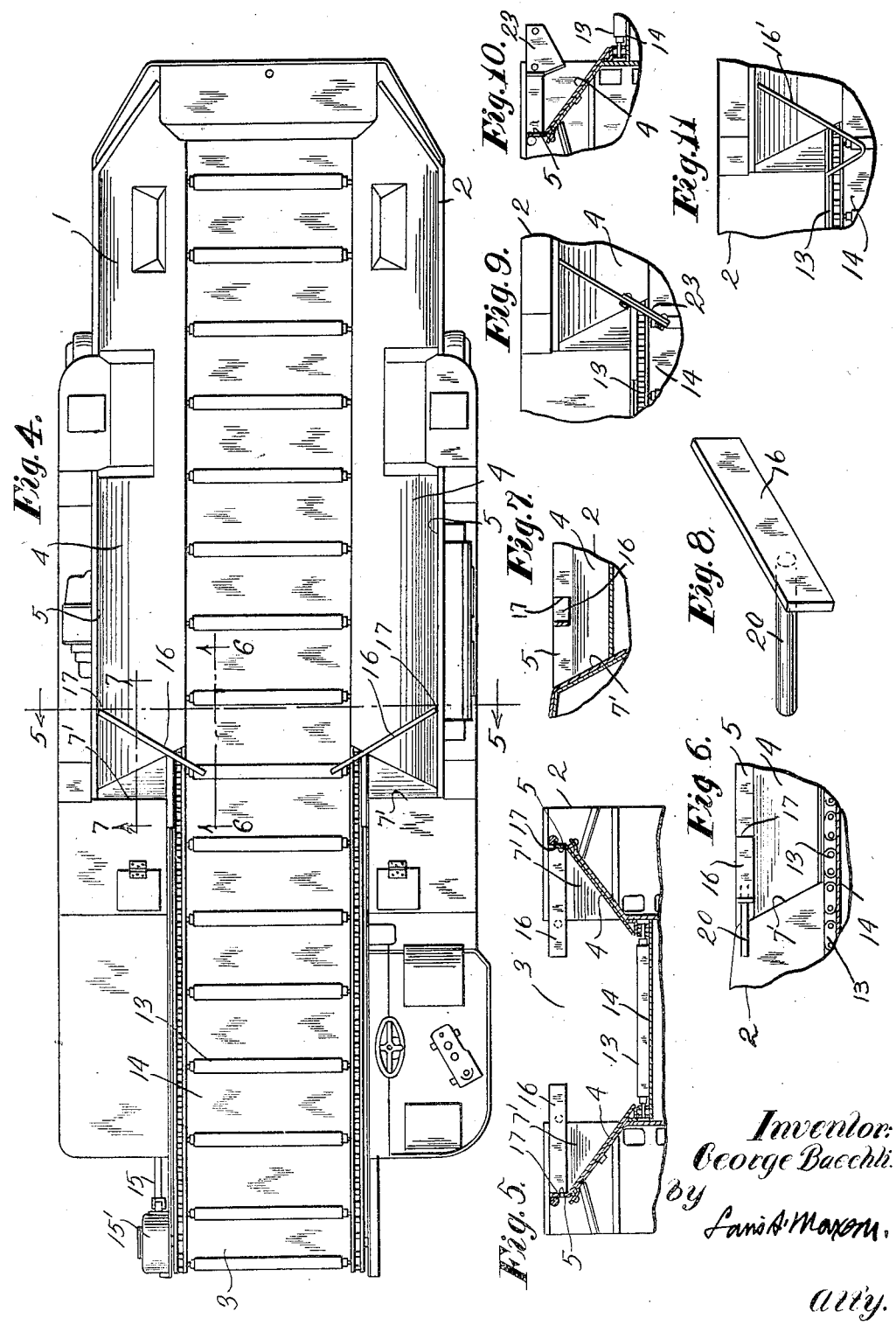

Patented Feb. 27, 1951

2,543,519

UNITED STATES PATENT OFFICE 2,543,519

MATERIAL HANDLING APPARATUS

George Baechli, New Philadelphia, Ohio, assignor to Joy Manufacturing Company, a corporation of Pennsylvania Application August 22, 1946, Serial No. 692,307

9 Claims. (Cl. 214—83.36)

My invention relates to apparatus for handling coal or other material, and more particularly to apparatus for receiving substantial quantities of coal or other material and delivering it at a controlled rate, when delivery is desired, along a relatively restricted path, and controlling its entrance to such restricted path so as to prevent substantial spillage over the top of the sides of the latter, or elsewhere.

In the mining of coal, occasions frequently arise for effecting the discharge of substantial quantities of coal through or along relatively narrow passages, and the means for effecting such discharge may be of such character as to cause the coal to tend to seek entrance to such passages at a substantially greater rate than delivery through such passages can take place, with the result that unless appropriate means is provided for controlling the rate of access of the coal to such passages, substantial spillage of the coal will almost certainly take place. As a practical illustration, reference may be had to "shuttle cars," vehicles for the underground transportation of substantial quantities of coal, frequently in lots of five tons or more. These shuttle cars comprise, usually, rubber tire mounted bodies having relatively large coal-receiving compartments which occupy the greater portions of their lengths and widths, and relatively narrow discharge passages, much narrower than the width of the receiving compartments and communicating with the latter usually through openings between relatively narrow, transverse walls connecting the more widely spaced side walls of the receiving compartment with the more closely spaced side walls of the discharge passage. Commonly, an endless conveyor extends for the full combined length of the storage compartment and the discharge passage, along the bottom of each of the same, and when, after the coal has been moved in the shuttle car from a point near the face to some desired point of discharge, the conveyor is started up, it tends to move the large mass of coal which is in the receiving compartment into the mouth of the discharge passage at such a rate that the discharge passage would be promptly overcrowded and overfilled, with a considerable loss of coal over the side walls of the discharge passage, and perhaps also over the transverse wall portions earlier mentioned, i. e., the portions near the inlet end, so to speak, of the discharge passage.

Among the objects of my invention is the provision of improved material-handling means—for example, shuttle cars, but in no sense limited thereto—in which, through improved flow controlling means incorporated therein, a controlled rate of entry of coal or other material to a discharge passage may be accomplished. Other objects and advantages of my invention will hereinafter appear.

In accordance with the invention in its broader aspects, there may be provided a body having a portion thereof capable of receiving a substantial amount of coal or other material and having in communication with such portion a materially narrower discharge passage, the full capacity of such discharge passage being inadequate to carry, without spilling, the volume of coal or other material which would be delivered thereto from the receiving portion, were flow unobstructed, by the operation of the means for causing discharging movement of the coal or other material. In a preferred embodiment of my invention, according to which it is incorporated in a shuttle car, the means for effecting discharge of material from the receiving space through the discharge passage may consist of an underlying conveyor which extends throughout the length of both the receiving space and the discharge passage. Obviously, however, within the broad scope of my invention other means of effecting the discharge of the material from the receiving space into the discharge passage and through the latter may be employed. To prevent the undesirable spillage which might otherwise attend the employment of relatively high speed discharge-effecting arrangements such as are otherwise desirable, according to a preferred embodiment of my invention, I provide flow-controlling devices which are arranged, as regards height, relatively near to the top of the discharge passage, so that as much material can pass them as can be delivered through the passage without spillage, and which are arranged in advance of the entrance to the discharge passage so that they may avoid a piling up of coal or other material at the very mouth of the latter, and also so that, in the event that masses of coal are forced over their tops, such masses may fall back into the receiving space rather than outside of the latter, and which flow-controlling devices converge rearwardly with respect to the apparatus so that the reaction of the moving coal or other material upon these devices may tend to center the moving material masses with respect to the center line of the discharge passage. Baffle means supported at their outer ends by the upper portions of the side walls of the material-receiving portion of the body and having their outer ends secured to said walls a substantial distance forwardly of the mouth of the discharge passage, and at or adjacent their other ends supported by desirably integrally connected (as by welding or through one piece construction) supporting means extending forwardly from the junctions of the end walls of the receiving space and the side walls of the discharge passage, such baffle means converging towards the mouth of the discharge passage, and having their mutually adjacent ends materially closer together than the distance between the side walls of the discharge passage but forwardly of the mouth of the latter, constitute a very satisfactory arrangement.

In the accompanying drawings, in which an illustrative embodiment of my invention and various modifications of it which may be used in practice are shown for purposes of illustration—

Fig. 4 is a top plan view of a very similar shuttle car but with slightly lower walls;

Fig. 5 is a vertical transverse section on the line 5—5 of Fig. 4;

Fig. 6 is a fragmentary vertical section on the plane of the line 6—6 of Fig. 4;

Fig. 7 is a fragmentary sectional view on the plane of line 7—7 of Fig. 4;

Fig. 8 is a perspective view of a baffle element;

Fig. 9 is a fragmentary view, similar to a portion of Fig. 4, showing a modified baffle construction;

Fig. 10 is a fragmentary sectional view, similar to the left-hand portion of Fig. 5, showing a face view of the modified baffle construction of Fig. 9;

Fig. 11 is a fragmentary plan view, similar to Fig. 9, showing a further possible modification of the baffle structure.

Figure 1:
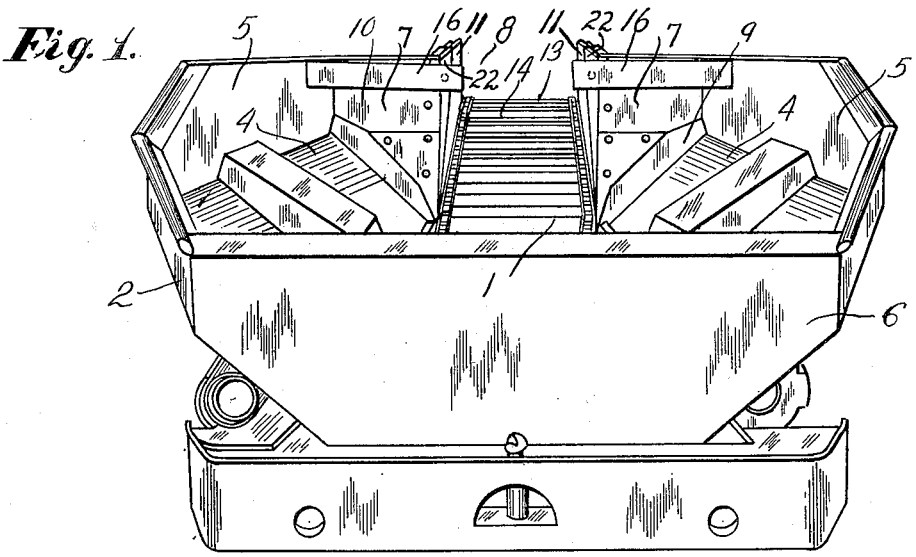
Fig. 1 is an end view of a shuttle car, partially looking down upon the top of the latter.
Figure 2:
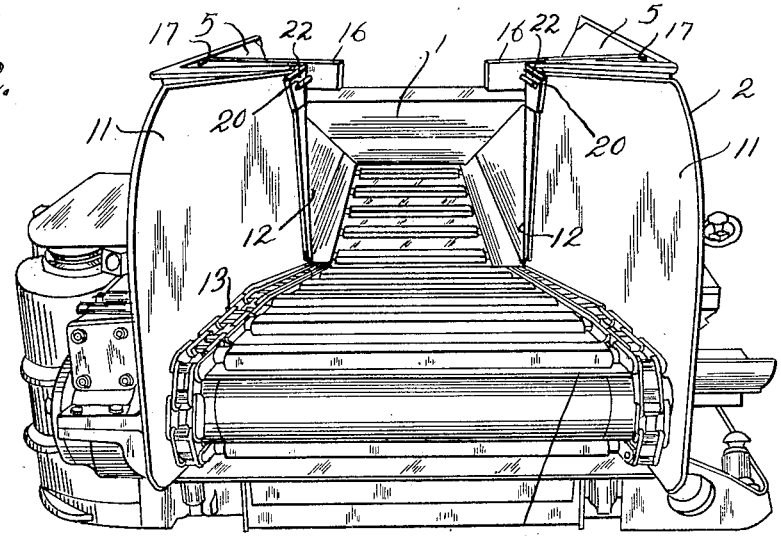
Fig. 2 is an opposite end view of a shuttle car.

Referring to the drawings, in which, as previously indicated, the illustrative embodiment is in the form of a shuttle car, it will be noted that a receiving compartment or space 1 of relatively large volume is provided by one end of a shuttle car 2, while a relatively narrow discharge passage 3 is also provided by said car, said discharge passage 3 being incapable of taking and carrying through it without spillage the volume of coal which may be in the receiving compartment 1 unless means be provided for preventing admission of coal to the discharge passage as rapidly as it is caused to tend to leave the receiving compartment by the means provided for effecting coal movement. While I have employed the terms "receiving compartment" and "receiving space" it is to be understood that these terms are not to be construed in a restricted sense, but rather are intended to designate and include within their scope provisions for temporarily receiving coal or other substances to be handled until they are discharged, whether after an interval or not, through a discharge passage. The specific construction of the compartment 1 is evidently, therefore, not essential except, with respect to more limited aspects of my invention, to the extent indicated by specific inclusion in the more specific claims directed to such aspects; and detailed description is not therefore necessary. It may be noted, however, that the shuttle car 2 has for its receiving space 1 sloping bottom walls 4, 4 surmounted by relatively vertical walls 5, 5, and end walls 6 and 7, the latter divided as at 8 by the entrance to the discharge passage 3. The end walls 7, 7 also each comprise an inwardly sloping lower wall portion 9, sloping away from the entrance to the discharge passage, and a relatively vertical wall portion 10. The discharge passage 3 has substantially parallel, upright side walls 11, 11 which form corners 12, 12 with the walls 10. It may be noted that in the particular shuttle car construction illustrated on sheet 2 of the drawings, the vertical sections 10 of the end walls 7' are not present.

For effecting discharge of the coal or other material from the compartment 1, I have illustrated an endless flight conveyor 13 movable along a bottom wall 14 and extending for the full length both of the compartment 1 and of the discharge passage 3. Any suitable power operated driving means for the conveyor may be used, as, for example, the motor driven drive shaft 15 of Fig. 4 driving the conveyor 13 through the transmission devices 15'. One suitable arrangement for driving the conveyor is shown in the copending application of Charles F. Ball, Serial No. 596,764, filed May 30, 1945, now Patent No. 2,426,980, granted September 9, 1947. Others will be obvious to those skilled in the art, as such drives are widely used in "shuttle cars." As the structure of the shuttle cars shown are in general, as so far described, well known, other details of structure and mode of operation not themselves of the essence of the invention need not be described. The important features so far described are: means for receiving temporarily a relatively substantial amount of coal or other material, a discharge passage of less cross-sectional area than the cross-sectional area of the coal receiving means, and means for causing the coal or other material to enter the discharge passage, and tending to cause it to enter at a rate exceeding the carrying capacity of the discharge passage.

For the purpose of limiting in a desired manner and to a desired degree ingress of coal or other material to the discharge passage, and of preventing a rate of ingress sufficient to cause material to fall over the edges of the discharge passage, and to some degree, in some forms of the invention, for the purpose of "putting a crown" on the material moving through the discharge passage, and to prevent, too, loss of material over the end wall of the storage compartment, and to effect return to the interior of the storage compartment of material which may pass over the top of the baffle means, I have provided baffle means, illustrative embodiments of which I shall now describe.

Figure 3:
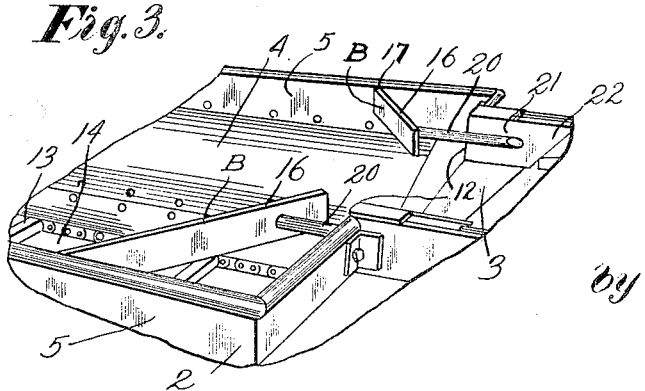
Fig. 3 is a fragmentary, oblique view of a portion of the shuttle car of Figs. 1 and 2, in each of said views baffle means being illustrated in accordance with my invention.

For the purpose of limiting the height of the coal or other material entering the discharge passage and accomplishing others of the functions hereinabove mentioned, I prefer to employ baffle devices, illustrated in various forms in the different figures of the drawings and identified in Figs. 1 to 8, inclusive, as B; these baffle devices including plate elements 16 welded or otherwise suitably secured, as at 17, to the upright upper portions of the upright side walls 5 of the body section 1 and extending obliquely with respect to the center line of the body so that they converge towards each other in the direction in which material is discharged from the shuttle car. These plates 16 may be supported in any desirable manner at or near their inner, mutually closer ends, as, for example, by rods 20 welded to them and to the upper side walls 21 of the discharge passage 3, either directly or through pads 22, as indicated in Fig. 3. Desirably, the inner ends of the baffle plates 16 project towards each other somewhat beyond the planes in which the side walls of the discharge passage lie, as well shown in Figs. 1, 2, 4 and 5; but they do not extend in the direction of flow of material at their points nearest to each other as far back, in terms of direction of material discharge, as the actual mouth of the discharge passage. As shown in Figs. 9 and 10, special interceptor plates 23 may be used if desired to reduce the height of the mass entering the discharge passage and to increase the "crown" imposed upon it; and, instead of using the rod and plate construction, a one-piece bent plate construction may be used as at 16', without departing from the scope of my invention, as shown in Fig. 11.

By reason of the construction and location of these baffles it will be obvious that, at least except at the central portion of the stream of material entering the discharge passage, it will be impossible for the stream to extend up to the tops of the side walls of the discharge passage. It will be evident that the material moving towards the discharge passage and which, in the absence of my baffles, might pass over the end wall portions 7, instead either is caused by the baffles to move along the baffles obliquely and then to enter the moving stream passing into the mouth of the discharge passage, or, if it passes over the top of the baffles, has space into which it may fall and be re-directed, into the line of material moving into the discharge passage, by the wall portions 9 or 4, or both of them. It will be evident also that the baffles do not obstruct the actual flow area within the discharge passage proper.

While I have in this application specifically described one form which my invention may assume in practice and certain modifications thereof, it will be understood that these are shown for purposes of illustration and that the invention may be further modified and embodied in various other forms without departing from its spirit or the scope of the appended claims.

What I claim as new and desire to secure by Letters Patent is:

1. Material handling apparatus comprising a material receiving body having a relatively wide material-receiving portion having side walls and a communicating relatively narrow discharge portion, means for effecting movement of material from said material-receiving portion through said discharge portion, and elevated, generally horizontal baffle means in said material-receiving portion, disposed substantially ahead of the entrance to said discharge portion and in oblique relation to the side walls of said material-receiving portion, for restricting the access of material to said discharge portion to prevent material overflowing the sides thereof.

2. Material handling apparatus comprising a material-receiving body having a relatively wide material-receiving portion and a communicating relatively narrow discharge portion, means for effecting movement of material from said material-receiving portion through said discharge portion, and laterally spaced baffle means disposed in said material-receiving portion and projecting from the sides of the latter towards each other for restricting the access of material to said discharge portion, said baffle means converging in the direction in which said relatively narrow discharge portion extends from said relatively wide receiving portion and being arranged ahead of and near the top only of said discharge portion whereby flow may take place beneath said baffle means.

3. Material handling apparatus comprising a material-receiving body having a relatively wide material-receiving portion and a communicating relatively narrow discharge portion, means for effecting movement of material from said material-receiving portion through said discharge portion, and baffle means in said material-receiving portion for restricting the access of material to said discharge portion, said baffle means having portions projecting laterally towards each other and spaced apart less than the width of such narrow discharge portion and being arranged ahead of and near the top only of said discharge portion whereby flow may take place beneath said baffle means.

4. Material handling apparatus comprising a material-receiving body having a relatively wide material-receiving portion and a relatively narrow discharge portion, means for effecting movement of material from said material-receiving portion through said discharge portion, and obliquely disposed, elevated baffle means disposed substantially ahead of the entrance to said discharge portion and having behind and below the same in said material-receiving portion space for the return to the material moving to said discharge opening of material passing over the top of said baffle means.

5. Material handling apparatus comprising a material receiving body having a relatively wide material-receiving portion having side and end walls and a relatively narrow discharge portion communicating with said relatively wide material-receiving portion through one of the end walls of the latter and itself having side walls making angular junctions with the portions of said latter end wall at the opposite sides of said discharge passage, means for effecting movement of material from said material-receiving portion through said discharge portion, and baffle means obliquely disposed in elevated locations and in spaced relation to said end wall, in the relatively wide material-receiving portion of said body and extending from the side walls thereof to points in said material-receiving body portion opposite the mouth of said discharge passage and nearer to each other than the width of the latter, said baffle means thereby partially obstructing the access of material to the upper portion only of said passage.

6. Material handling apparatus comprising a material receiving body having a relatively wide material-receiving portion having side and end walls and a relatively narrow discharge portion communicating with said relatively wide material-receiving portion through one of the end walls of the latter and itself having side walls making angular junctions with the portions of said latter end wall at the opposite sides of said discharge passage, and baffle means each secured to one of said side walls of said wide portion and having supporting means for its other end extending to one of said junctions, said baffle means obliquely disposed in the relatively wide material-receiving portion of said body and extending from the side walls thereof to points opposite the mouth of said discharge passage and partially obstructing the access of material to the upper portion of said passage.

7. Material handling apparatus comprising a material receiving body having a relatively wide material-receiving portion having side and end walls and a relatively narrow discharge portion communicating with said relatively wide material-receiving portion through one of the end walls of the latter and itself having side walls making angular junctions with the portions of said latter end wall at the opposite sides of said discharge passage, means for effecting movement of material from said material-receiving portion through said discharge portion, and baffle means obliquely disposed in the relatively wide material-receiving portion of said body and extending in an elevated position from the side walls thereof to points opposite and part way across the mouth of said discharge passage and partially obstructing the access of material to the upper portion only of said passage but providing space within the areas bounded by said first mentioned side walls and said end walls and said baffle means through which material passing over the tops of said baffle means may be returned through the space below such baffle means to the line of material moving towards said discharge portion.

8. Material handling apparatus comprising a material receiving body having a relatively wide material-receiving portion having side walls and a relatively narrow discharge portion having a delivery end, an endless conveyor extending along the center of said body throughout the bottom of each of said portions thereof, and spaced baffle devices disposed substantially ahead of the entrance of said discharge portion and arranged adjacent the upper portion only of the latter for limiting the height of the mass of material which enters said discharge portion, each baffle device extending inwardly from a side wall of said material-receiving portion and having its inner end nearer than is its outer end to the delivery end of said discharge portion.

9. Coal handling apparatus comprising a coal-receiving body having a restricted discharge passage at one end, said passage being materially narrower than said body, and said body also having a coal-receiving compartment, an endless conveyor travelling along the center of said body and through said discharge passage, said body having lateral walls defining said compartment sloping towards said conveyor and also having transverse wall portions adjacent the mouth of said discharge passage and extending laterally outwardly therefrom and having lower portions which slope away from the entrance end of the discharge passage, and baffle means spaced above the bottom of the mouth of said discharge passage and disposed obliquely with respect to the side and end walls of said compartment and in spaced relation to the mouth of said discharge passage whereby material passing over the top of said baffle means may be directed by said walls back towards the conveyor.

GEORGE BAECHLI.

REFERENCES CITED

The following references are of record in the file of this patent:

UNITED STATES PATENTS

| Number | Name | Date |
|---|---|---|
| 2,325,731 | Arentzen et al. | Aug. 3, 1943 |
| 2,326,444 | Dudley | Aug. 10, 1943 |

FOREIGN PATENTS

| Number | Country | Date |
|---|---|---|
| 209,589 | Switzerland | Apr. 30, 1940 |